Figure 1:
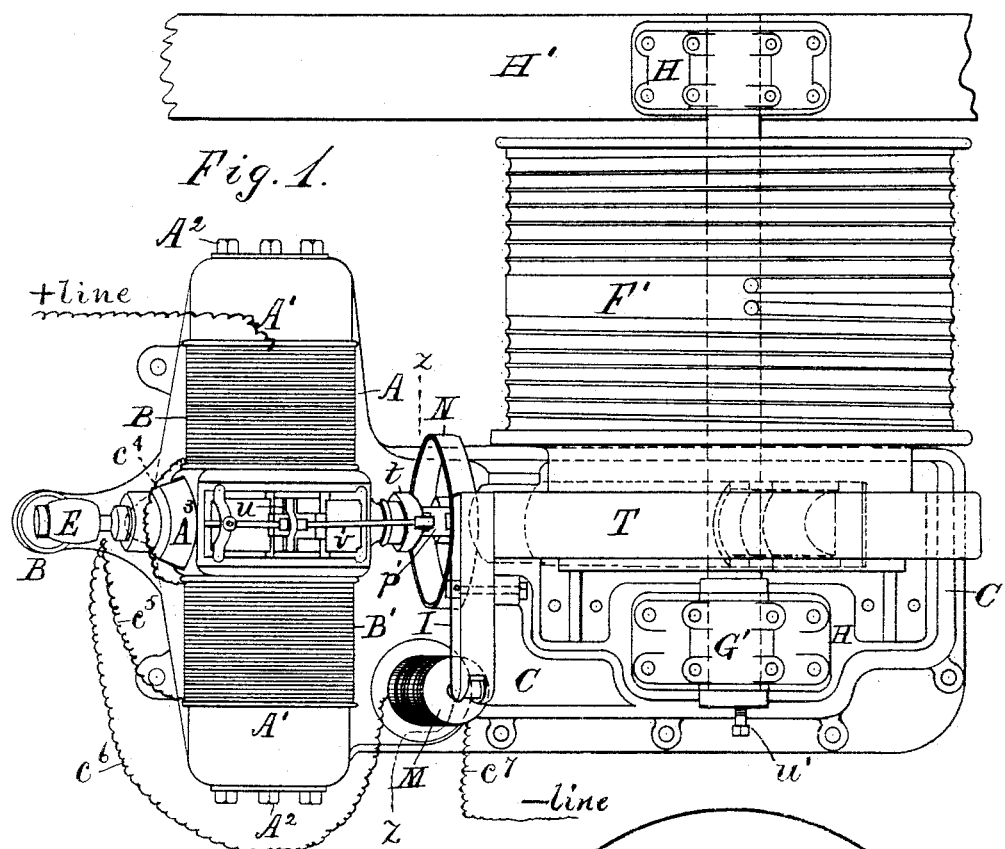

(No Model.) 8 Sheets—Sheet 1.
W. BAXTER, Jr.
ELECTRICAL HOISTING MACHINE.

No. 449,661. Patented Apr. 7, 1891.

Attest:
J. L. Lore,
J. C. Fischer.

Inventor.
William Baxter, Jr.,
per Crane & Miller, Attys.

THE NORRIS PETERS CO., PHOTO-LITHO., WASHINGTON, D. C.

(No Model.) 8 Sheets—Sheet 2.

W. BAXTER, Jr.
ELECTRICAL HOISTING MACHINE.

No. 449,661. Patented Apr. 7, 1891.

Attest:
L. Lee
F. C. Fischer

Inventor.
William Baxter, Jr.
per Crane & Miller, attys.

(No Model.) 8 Sheets—Sheet 3.

W. BAXTER, Jr.
ELECTRICAL HOISTING MACHINE.

No. 449,661. Patented Apr. 7, 1891.

Attest:
L. Lee.
F. C. Fischer

Inventor.
William Baxter, Jr.,
per Crane & Miller, Attys.

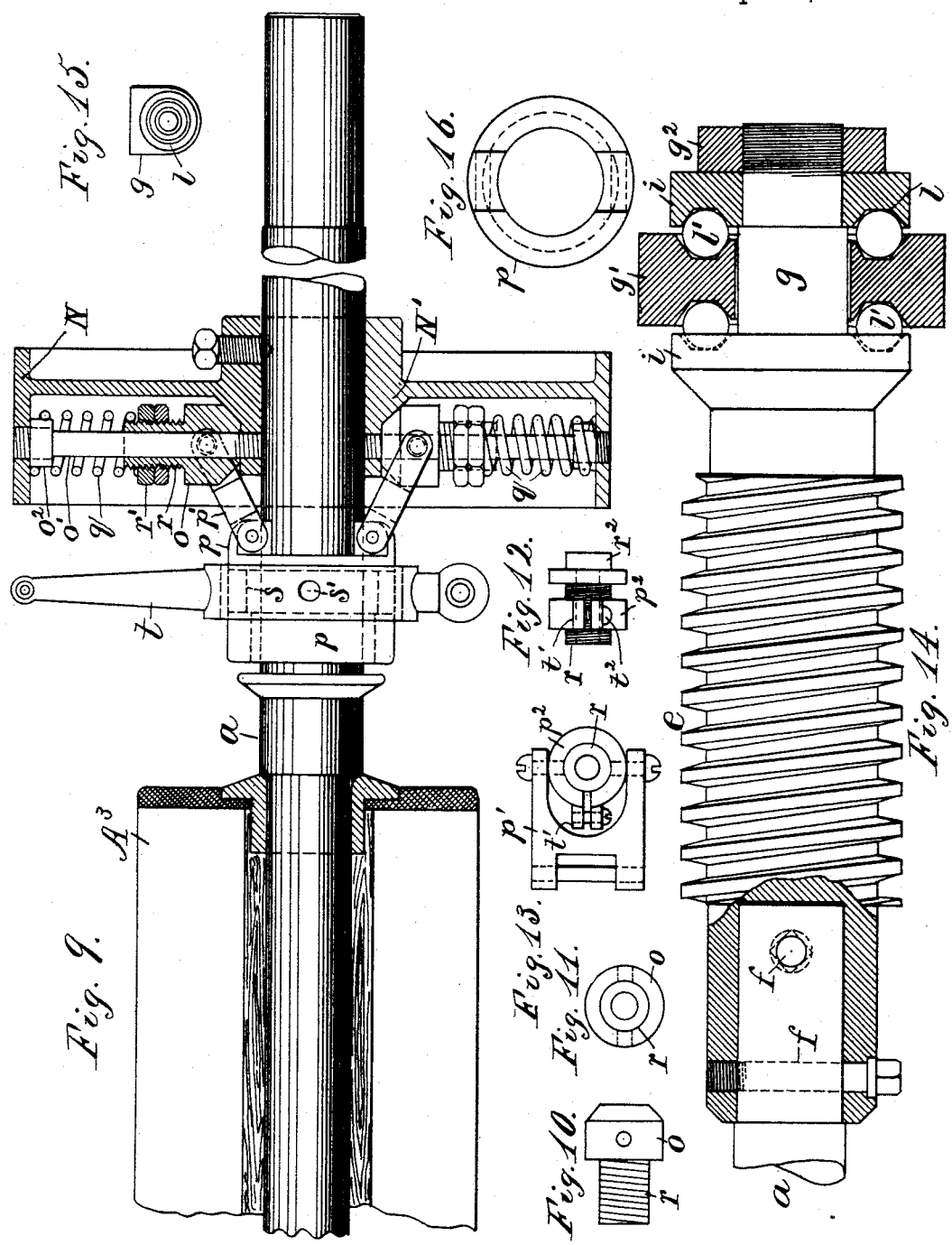

(No Model.) 8 Sheets—Sheet 5.
W. BAXTER, Jr.
ELECTRICAL HOISTING MACHINE.
No. 449,661. Patented Apr. 7, 1891.
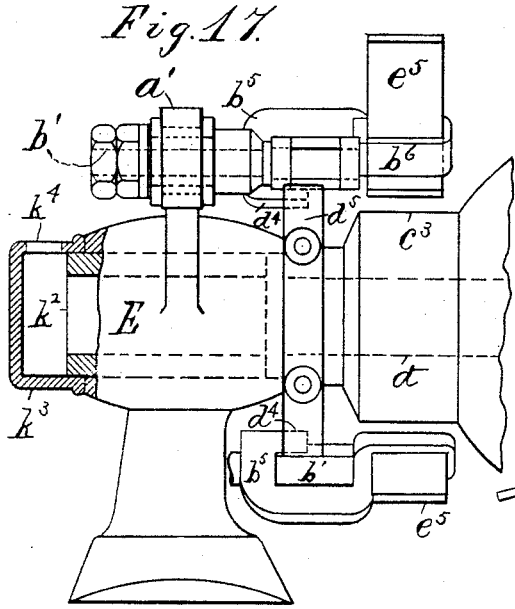
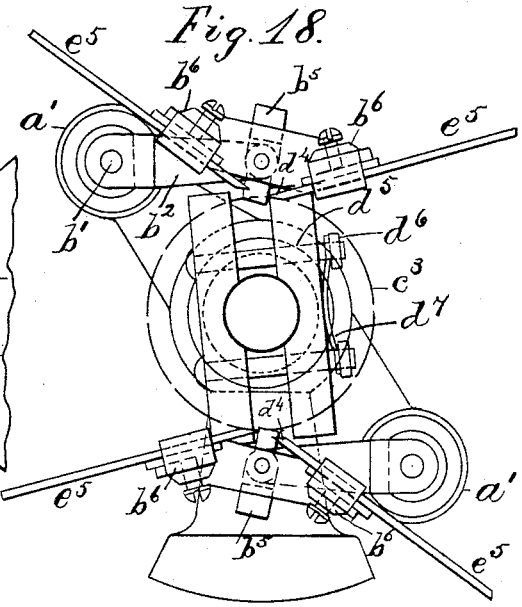
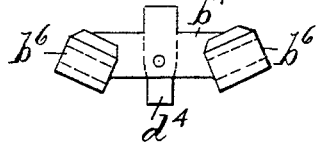
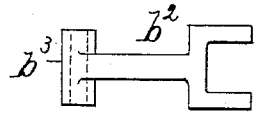
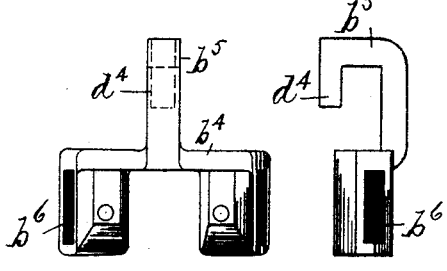
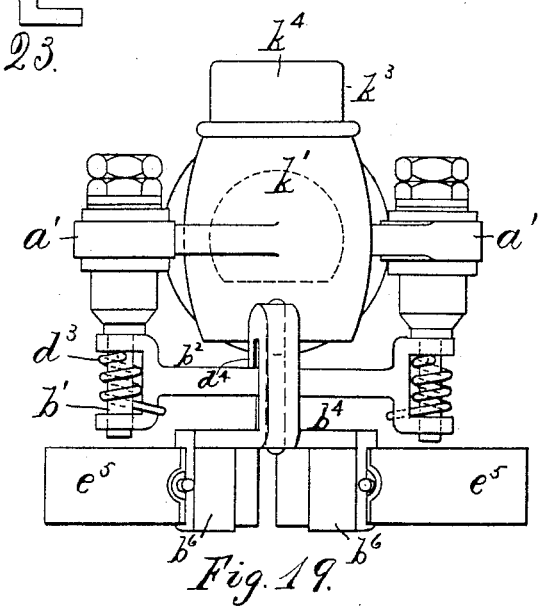
Attest:
L. Lee.
F. C. Fischer.
Inventor.
William Baxter, Jr., per
Crane & Miller, attys.

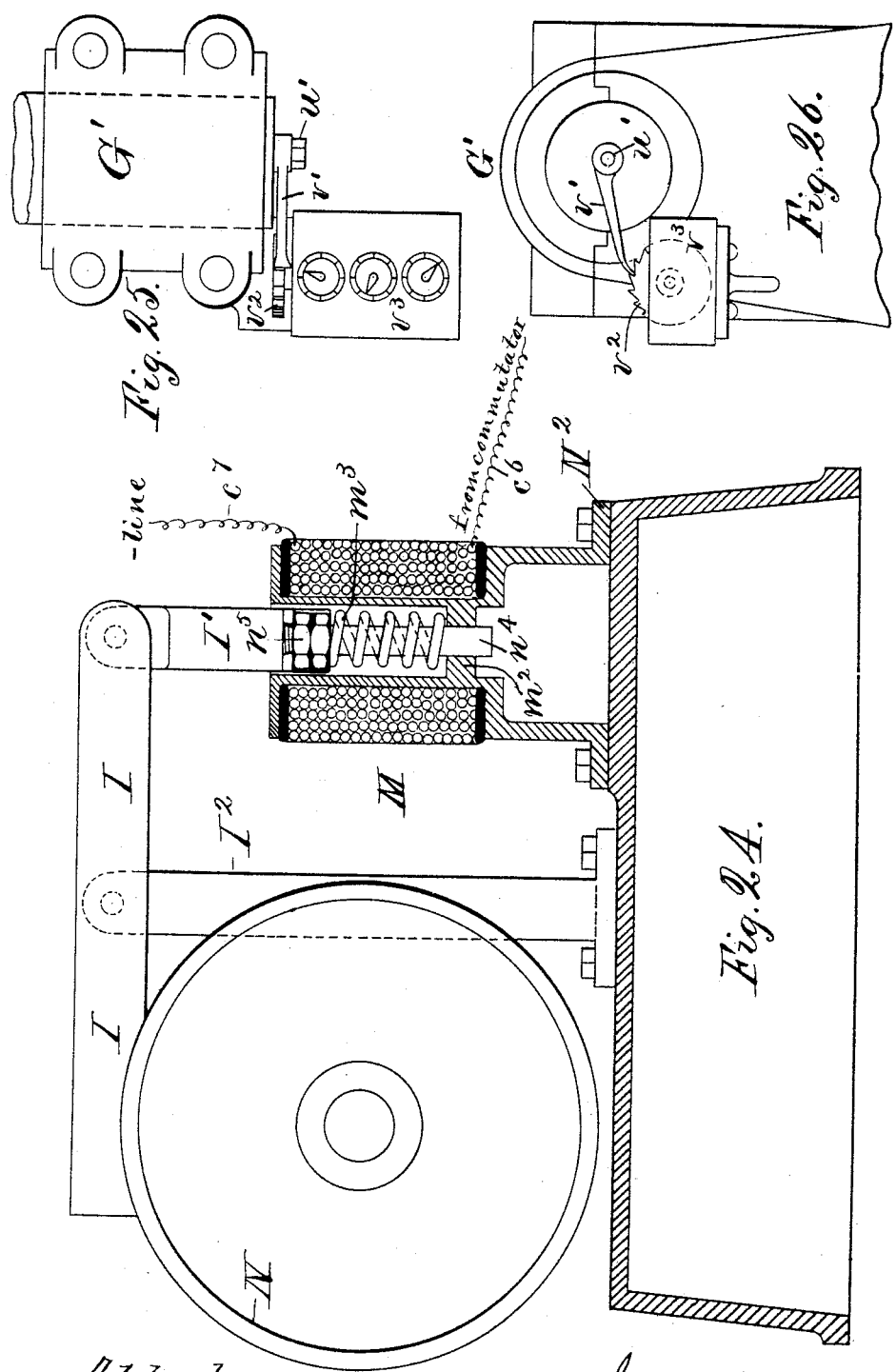

(No Model.) 8 Sheets—Sheet 7.

W. BAXTER, Jr.
ELECTRICAL HOISTING MACHINE.

No. 449,661. Patented Apr. 7, 1891.

Attest:
L. Lee
F. C. Fischer

Inventor.
William Baxter, Jr.,
per Crane & Miller, Attys.

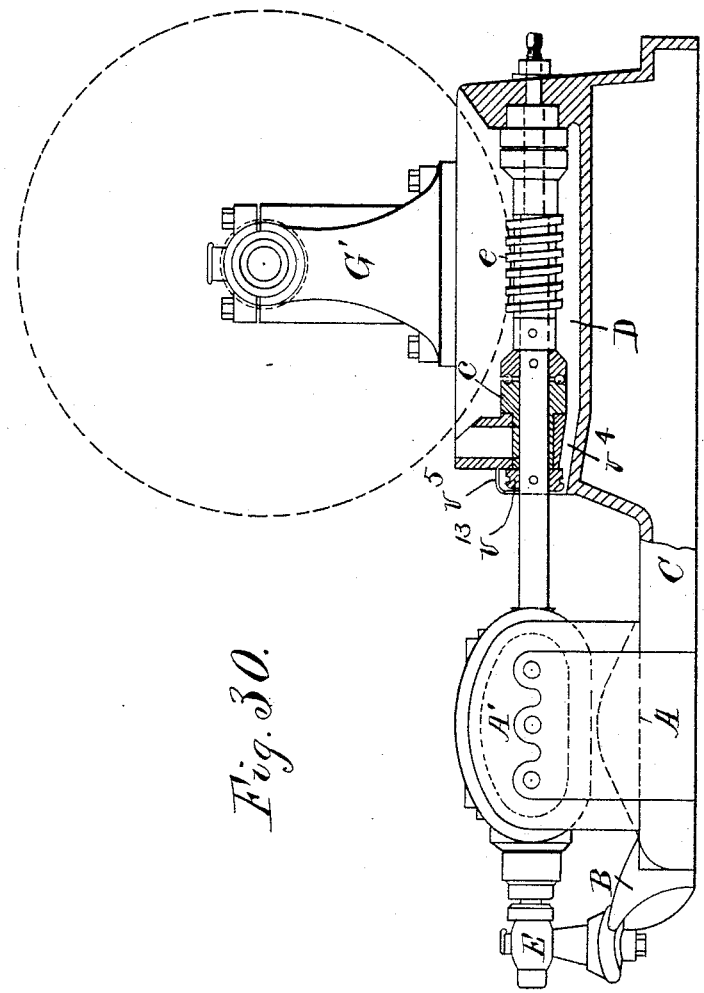

UNITED STATES PATENT OFFICE.

WILLIAM BAXTER, JR., OF BALTIMORE COUNTY, ASSIGNOR TO THE BAXTER ELECTRIC MOTOR COMPANY, OF BALTIMORE, MARYLAND.

ELECTRICAL HOISTING-MACHINE.

SPECIFICATION forming part of Letters Patent No. 449,661, dated April 7, 1891.

Application filed March 2, 1888. Renewed October 31, 1890. Serial No. 369,874. (No model.)

*To all whom it may concern:*

Be it known that I, WILLIAM BAXTER, Jr., a citizen of the United States, residing in the Ninth election district of the county of Baltimore, State of Maryland, have invented certain new and useful Improvements in Electrical Hoisting-Machines Worm-Geared, fully described and represented in the following specification and the accompanying drawings, forming a part of the same.

This invention relates to an electrical hoisting-machine arranged to transmit the motion of the motor-armature to a hoisting drum or wheel by screw or worm gearing, and the construction claimed herein is a specific form of the invention claimed in my application, Serial No. 266,633, filed March 8, 1888, in which I have claimed an electric hoisting-machine in which a single metallic bed performs the double function of sustaining the various elements in their proper relation to one another, while it also serves as a bridge in magnetic connection with the cores of the field-magnet, so as to form a neutral part of the motor-magnet field. Where the velocity of the armature in relation to the drum is too great to employ a single worm, an intermediate shaft is used to avoid the construction of a worm and wheel with teeth of too fine a pitch, and the intermediate shaft is connected with the hoisting-pulley by either spur or worm gearing, as may be required. In connection with such gearing a pulley may be used to wind up the rope, as shown in the drawings annexed, or a wheel may be used to actuate a rope or belt by frictional contact, as is common in some cases. The word "drum" is used herein to designate any form of hoisting pulley or wheel.

My invention consists partly in the combination of a motor having only two magnet-cores with a drum and worm-gearing upon a single bed, the whole forming a complete organized portable machine and the bed forming the bridge or yoke of the two magnet-cores.

The invention also consists partly in an inclined arrangement for the armature-shaft, so that the worm applied thereto may be immersed in oil in an inclined trough, partly in the construction of such trough to prevent the escape of oil from its lower end and to sustain the thrust of the screw, and partly in the construction of a thrust-plate with friction washers or balls applied against its opposite surfaces and collars upon the armature-shaft.

My invention also includes mechanism for reversing the commutator-brushes when the armature is rotated in a reverse direction, partly in a hoister-registering mechanism, and other details of construction hereinafter described and claimed.

The machine illustrated herein is arranged to operate with a constant current, and is therefore provided with a governor, as described in my patent, No. 384,117, dated June 5, 1888, to vary the intensity of the magnetic field by short-circuiting a portion of the field-coils; but when the machine is intended for use with a constant-potential circuit the governor would be left off and the regulation would be effected by a shunt or differential winding of the magnet-coils.

Figure 2:
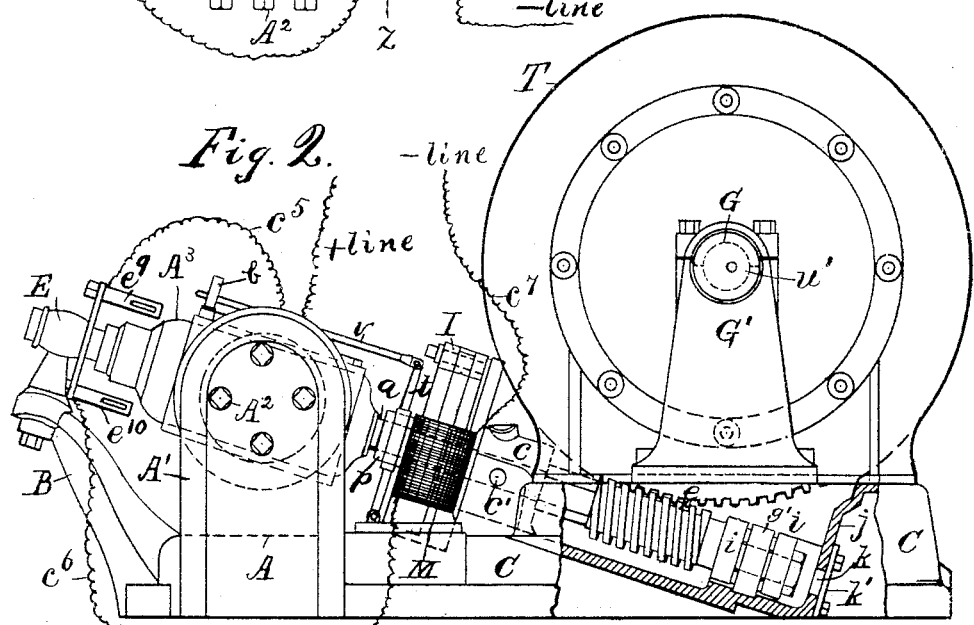
Figure 3:
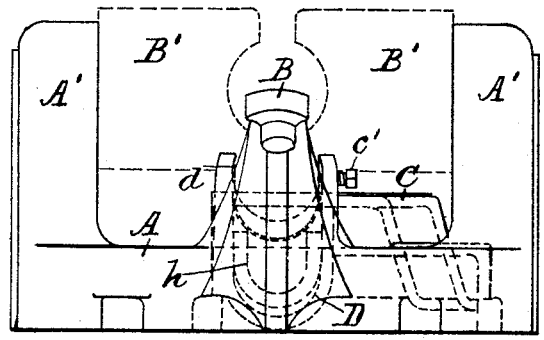
Figure 4:
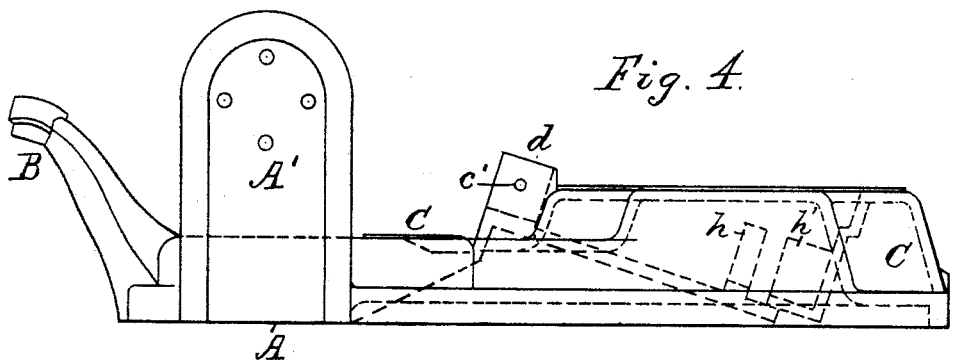
Figure 5:
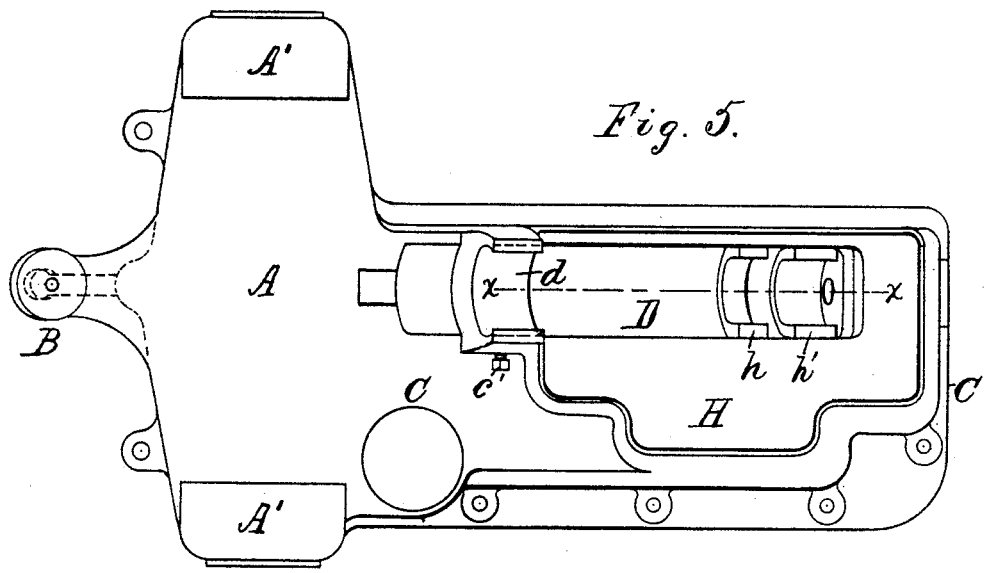
Figure 6:
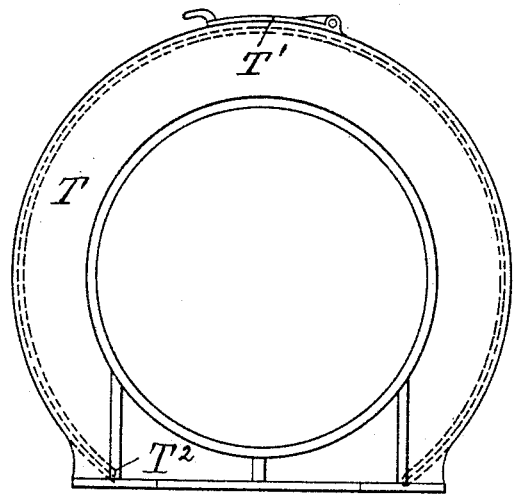
Figure 7:
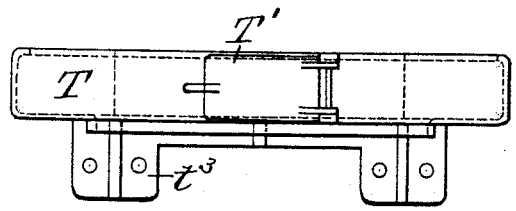
Figure 8:
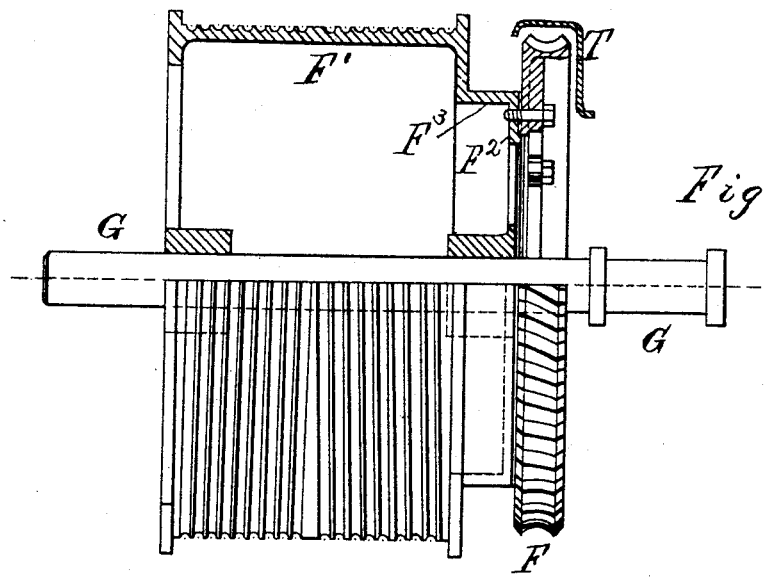
Figure 27:
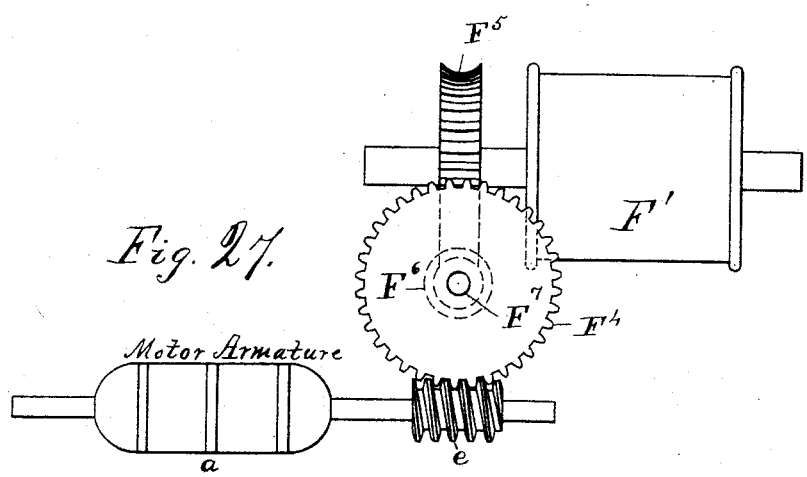
Figure 28:
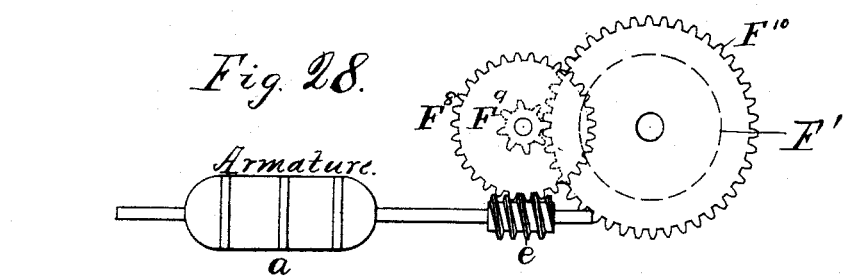
Figure 29:
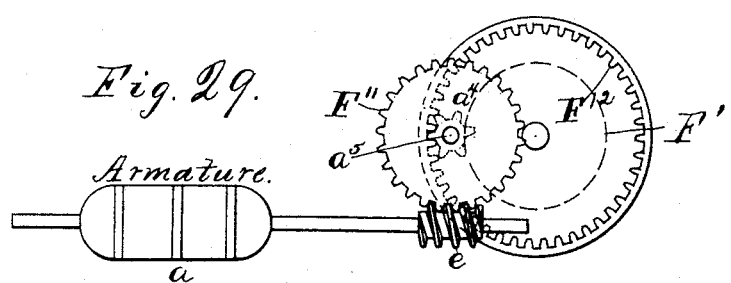

In the drawings, Figure 1 is a plan of a hoisting-machine provided with the greater part of my improvements. Fig. 2 is a side elevation of the same with the bed, broken away to the center of the worm-shaft, as indicated by the line $x\ x$ in Fig. 5. Fig. 3 is an end elevation of the bed detached from all the other parts. Fig. 4 is a side elevation of the same, and Fig. 5 a plan of the same. Fig. 6 is a side elevation of the worm-wheel guard detached. Fig. 7 is a plan of the same. Fig. 8 is a plan of the drum and worm-wheel detached, with one-half of the guard, the drum, and wheel in section where hatched. Fig. 9 is a view of part of the armature and its shaft with the projecting end carrying the governor, the latter being in section at the center line where hatched. Fig. 10 is a side view, and Fig. 11 an end view, of one of the governor-weights. Fig. 12 is a side view of a governor-weight of alternative construction, and Fig. 13 is a plan of the same with one of the attached links. Fig. 14 is a view of the worm with its coupling to the armature-shaft and its thrust-bearing, the parts being shown in section on the center line where hatched. Fig. 15 is a view of the thrust-bearing on the scale of Fig. 2. Fig. 16 is an end view of the governor-sleeve. Fig. 17 is a side elevation, partly in section, where hatched of the bearing E for the outer end of the armature-shaft, with a part of the shaft carrying the commutator and reversing-clamp. Fig. 18 is an elevation of the same parts viewed from the commutator with the circle of the latter shown in dotted lines $c^3$. Fig. 19 is a plan of the same parts with the armature-spindle and commutator omitted. Fig. 20 is a front view similar to that shown in Fig. 18 of one of the frames of the pivoted or swiveling brush-holders. Fig. 21 is a plan of the same, and Fig. 22 an edge view of the same, and Fig. 23 a plan of one of the links carrying such brush-holder frame. Figs. 9 to 23, inclusive, are upon a scale four times as large as the other figures with the exception of Fig. 15. Fig. 24 is a transverse section of the frame on line $z\ z$ in Fig. 1 with the brake-pulley shown (independently of the governing mechanism) in connection with its lever and operating-magnet, the magnet being shown in section where hatched. Fig. 25 is a plan of the bearing G' with the registering mechanism attached, and Fig. 26 is an elevation of the upper part of the bearing and registering mechanism. Figs. 27, 28, and 29 show alternative forms of gearing. Fig. 30 is an alternative form for the bed.

With the inclined oil-trough shown in Figs. 2 and 4 the worm may be partly immersed in oil by filling the lower end of the trough and preventing the escape of the oil by a plate at such lower end; but where the worm and armature shaft are arranged horizontally, as in Fig. 30, the oil-trough is sufficiently closed at each end to retain a portion of the oil below the level of the armature-shaft, and the lower part of the worm may thus be lubricated by the oil without the latter having any tendency to escape by gravity. The bearing $c$ between the worm and the armature in Fig. 30 is shown thus constructed, and by fitting the armature-shaft snugly to such bearing and extending the sides of the oil-trough above the top of the worm, as shown in Fig. 30, the oil may be supplied to the trough in such amount as to lubricate the entire worm, while the oil is prevented from escaping by gravity.

The bed of the machine is shown formed with a bar A, having perpendicular lugs A' at each end to sustain the magnet-cores, which are shown with their coils B' in Fig. 1 attached to the lugs by bolts $A^2$. The magnet-coils are indicated merely by dotted lines B' in Fig. 3. The bar A forms the bridge or yoke of the magnet and is the most direct path between the bases of the cores, and the remainder of the bed consists in extensions B and C, projected from opposite sides of the bar to sustain the moving parts of the apparatus, as the armature $A^3$ and drum F'. The motor-shaft or armature-spindle $a$ extends midway between the lugs A' at an angle with the bottom of the bed, its outer bearing E being attached to the extension B, which is preferably curved upward to support it, and its inner end running in a removable box $c$, which is held by set-screws $c'$ in a socket $d$. This socket is cast at the nearer or upper end of an oil-trough D, which is formed as a depression in the bed to receive the worm $e$, which is shown in Fig. 14 as coupled to the inner end of the armature-shaft by transverse bolt $f$. The worm is provided at its lower end with a stud or worm-shaft $g$, which passes through a thrust-bearing $g'$, fitted between bridges $h\ h'$ in the lower end of the oil-trough. The worm-wheel F, attached to one end of the hoisting-drum F', is sustained over the worm by means of a shaft G, mounted upon a standard G'. The standard is carried by a seat H, formed upon the bed at the side of the trough D.

To facilitate the construction and arrangement of the parts, the socket $d$ is made larger than the worm, so that when the set-screw $c'$ is relaxed the bearing $c$ and worm may be withdrawn longitudinally through the socket from beneath the worm-wheel without removing the latter. When testing the adjustment of the worm and wheel, the worm may thus be repeatedly removed for examination or alteration without displacing the heavy drum F', to which the worm-wheel is attached. When thus fitting the worm to the worm-wheel, the worm would not be secured in its lower bearing, as hereinafter set forth.

The bottom of the oil-trough is closed by a plate $k'$, bolted to a flange $j$, cast at the lower end of the trough, the flange being perforated by a hole $k$ to admit a boring-bar for boring the socket $d$ and the contiguous faces of the bridges $h\ h'$.

The worm is provided at opposite sides of the thrust-bearing with collars $i$, and the bearing and collars are preferably formed with annular grooves $l$ to receive anti-friction balls $l'$, and the thrust-bearing is thus adapted to sustain the pressure of the worm in either direction, while the friction is reduced to the lowest point. The worm is preferably made of steel, and one of the collars $i$ is removably attached to the stud $g$ by a nut $g^2$ to permit the application of the collars to opposite sides of the thrust-bearing $g'$.

In some instances the thrust-bearing and collars $i$ may be made with flat hardened faces and washers interposed in lieu of the anti-friction balls.

The bed is preferably formed by casting integral with the lugs A' and extensions B and C, including the oil-trough with its socket $d$ and bridges $h\ h'$, for the purpose of bringing all these parts into magnetic connection with the magnetic field of the motor, as claimed in my application, Serial No. 266,633, filed March 8, 1888; but the extensions may be attached to the motor-bridge A by bolting them thereto, if desired. The frame is not extended beneath the drum F' to avoid interference with the hoisting-ropes if it is desired to carry them vertically downward and to avoid an undue expansion of the frame, and the outer bearing for the drum-shaft is preferably sustained by an independent box H, sustained upon any convenient support, as the beam H'. (Shown only in Fig. 1.) Such construction is preferable for a bed in magnetic connection with the motor magnetic field, while the independent bearing H affords an opportunity to furnish a yielding support to the drum-shaft to apply an electric switch, as claimed in my application Serial No. 265,574, filed February 28, 1888, for controlling the movement of the motor.

The brake-lever I is shown in Fig. 24 connected with a core I', fitted within the tubular magnet M.

A bridge or diaphragm $m^2$ is provided within the bottom of the magnet for the purpose of sustaining a spring $m^3$, which is inserted in the magnet to press the lever I normally against the brake-pulley N. The lever is pivoted to a post $I^2$, projected upward from the bed adjacent to the pulley N, to hold the free end of the lever approximately in its proper relation to the pulley, and a stem $n^4$ is extended from the bottom of the core through the diaphragm $m^2$ and provided with nuts $n^5$ to regulate the tension of the spring.

The motor is shown in Figs. 1 and 2 provided with a governor adapted to cut out portions of the field-coils from the electric circuit, as claimed in my patent, No. 384,117, dated June 5, 1888, filed August 26, 1887, and the brake-lever I, actuated by the solenoid-magnet M, is also shown in Figs. 1 and 2. When the armature-shaft is inclined to the bed, the brake-magnet is formed with an inclined base, as shown in Fig. 2, to adjust it normally at right angles to such shaft.

The governor is shown in detail upon a larger scale in Figs. 9 to 13, inclusive, the governor-weights being combined, for convenience, with the smooth wheel N, to the periphery of which the brake-lever I is applied. The weights $o$ are shown fitted to slide upon rods $o'$, fixed radially between the rim of the wheel and its hub N', and a sleeve $p$ is fitted to slide upon the armature-shaft $a$ and connected to the weights by links $p'$. Spiral springs $q$ are fitted between the weights and the rim of the wheel N to resist their centrifugal force, and the weights are provided with threaded shanks $r$, having nuts $r'$ fitted thereto and arranged to bear upon the inner ends of the springs to adjust their tension to the desired speed. The sleeve $p$ is provided with a swiveling collar $s$, having pins $s'$ fitted to a governor-lever $t$, by which a shunt-block $u$ (shown only in Fig. 1) is actuated through the medium of a rod $v$, as set forth in my said patent, No. 384,117, dated June 5, 1888. The rods $o'$ are shown inserted through the rim of the pulley with jam-nuts $o^2$ upon its inner side; but it is obvious that where a pulley is not required for use with a brake-lever the said nuts may be made to resist the outward pressure of the springs $q$. The governor-weights, as well as the sleeve and lever by means of which they actuate the shunt-block $b$, are so close to the magnet-poles that if made of iron they would be affected by the magnetism and prevented from moving freely to perform their normal functions. The sleeve and lever would be more or less attracted toward the poles, and the influence of the governor would be rendered irregular by any variation in the magnetism of the latter, and the weights would also be variably affected. I therefore make the weights $o$, the sleeve $p$, and the lever $t$ of diamagnetic metal, and thus relieve them entirely from the attractive force of the magnetic field.

The bearing E at the higher extremity of the armature-shaft is provided with a bush $k^2$ to facilitate repairs, and the end of the bush is projected beyond the outer side of the bearing to carry a cap $k^3$ for feeding lubricant to the bearing. A hole $k^4$ is formed in the cap to apply the lubricant, and the cap thus supplies grease to the gearing as required and prevents it flying off of the end of the shaft.

Where it is necessary to insert the weights and springs within a very small governor-pulley, the links $p'$ may be connected with a threaded collar and the weight tapped into the same, as shown in the detached view in Fig. 12. The weight in such case is provided with a nozzle $r^2$ to fit within the spring, and the collar may be split, with ears $t'$, having a clamp-screw $t^2$, as shown in Fig. 12, to hold the weight in its position when adjusted.

To secure compactness in the arrangement of the motor and governor and hoisting-drum, the governor is preferably combined with the friction-brake and located adjacent to the bearing $c$, as shown in Figs. 1 and 2, and as the armature-shaft is inclined the brake-pulley N is tipped, which requires the magnet M to be secured at a suitable angle upon the extension C to operate the lever I upon the rim of the pulley N. The weights of the governor would be preferably protected by an external ring, and the pulley-rim performs in my construction a double function in serving as a guard around the governor-weights to prevent their accidental contact with any object brought near the motor and also as a brake-drum or cylindrical surface upon which the brake-lever may operate.

The electrical connections to operate the brake and motor automatically will be described hereinafter.

My improvement in the governor consists in the combination of the governor weights and springs with a revolving hub on the armature-shaft and with a brake wheel and lever, the weights being fitted to slide radially upon guides or rods attached to the hub and being connected with a switch to regulate the motor as required.

In operating an electric hoisting-machine such as is described herein the armature must be arranged to rotate in either direction, and in case two pairs of brushes are applied to the commutator one pair requires to be shifted to an inoperative position to prevent them from being injured by a reversal of the motion of the commutator.

In Figs. 17 to 23, inclusive, I have shown a device for automatically shifting the brushes the moment the motion of the commutator is reversed, the mechanism consisting in a pivoted holder carrying two brushes and in a friction-clamp applied to the armature-shaft and arranged to shift the holder by its rotation with the shaft when the latter is reversed.

Heretofore it has been common to pivot two brush-holders for shifting-brushes at the opposite sides of the neutral line of the armature or commutator, and to arrange in each two brushes of opposite signs—that is, connected with the opposite poles of the generator—by which construction it was necessary to insulate the brushes from one another. With such a construction it was absolutely necessary, in order to reverse the motion of the armature, that the polar connections of the brushes should be unchanged and that the brush-holders themselves should be tipped to throw the opposed positive and negative brushes out of contact with the commutator upon the opposite sides of its neutral line and to throw into contact the complementary negative and positive brushes.

In operating a motor with an elevator system such as I have claimed in my application, Serial No. 267,524, filed March 17, 1888, it is often desirable to reverse the rotations of the armature as the most simple means to reverse the operation of the hoisting mechanism; and with such a construction for the brushes and holders as I have just described it would be necessary to use a hand-rope or some other device actuated, perhaps, from the elevator-car to apply the brushes properly to the commutator to secure the desired reversal of the motor. With the construction I have devised and shown herein no external means is required to reverse the armature-brushes; but the brushes are so arranged in their holders that they are not insulated from one another, and the mere reversal of the polarity in such holders operates instantly to reverse the armature and to shift the brushes to the new position required. This construction is shown in Figs. 17 to 23, in which the outer bearing E is shown provided with two ears $a'$, carrying studs $b'$, upon which are hinged arms $b^3$, to the outer ends $b^3$ of which are pivoted the frames of the double brush-holders $b^4$. The inner sides of the brush-holders are inclined toward the shaft $a$ and the commutator, and the brushes $e^5$ are fitted therein, with their inner ends suitably adjusted to press upon the commutator at the desired points when the brush-holder is tipped to one side or the other. Springs $d^3$ (shown only in Fig. 19) are applied to the studs $b'$ to press the arms toward the commutator $c^3$, and the ends of the arms $b^3$ are pivoted to the side of the bar or frame $b^4$ (to the opposite ends of which the brush-holders $b^6$ are fixed) and to an ear $b^5$, formed thereon. The ear $b^5$ is provided with a lug $d^4$ upon the side toward the armature-shaft $a$ to engage with friction-clamps $d^5$, which are fitted upon the shaft between the commutator and the bearing $k'$ and are pressed thereon by bolts $d^6$ and a spring $d^7$. The clamps are formed as straight bars hollowed where in contact with the shaft, and the lug $d^4$ fits into a space between the outer ends of the bars, so as to be readily pressed in either direction by a slight rotation of the clamp.

In motors of my construction very little "lead" is given to the brushes, and the two brushes which are carried by each of the double brush-holders $b^6$ may therefore be inclined inward or toward the shaft as they approach one another and the central line of the commutator. The pivot of the combined or double brush-holder is placed outside the junction of the brush upon the neutral line of the commutator, and a very slight rotation of the brush-holder suffices to withdraw either brush from contact with the commutator and to throw the opposite brush into action. Owing to the absence of lead, the brushes bear upon the commutator nearly at the neutral point in a line between the pivot of the brush-holder and the center of the armature-shaft, and the reversal of the commutator thus tends immediately by its pressure upon one of the brushes to rotate the brush-holder upon its pivot independently of the clamp $d^5$, and the nuts upon the bolts $d^6$ and the spring $d^7$ furnish a means of adjusting the clamp lightly upon the shaft $a$, so as to aid such tendency and effect the reversal of the brushes with a very slight degree of friction between the clamps and the shaft. With the small angle of rotation required in the clamp to reverse the brush it is obvious that the first effect of reversing the current in the brushes and commutator would be to shift the brushes in the desired manner, and injury to either of the brushes which may have been in contact with the commutator is thus effectively avoided.

In Fig. 1 a small stud or bolt $u'$ is shown projected from the end of the hoisting-drum shaft at one side of the standard G'. Such bolt or stud is designed to actuate a registering mechanism, which may be made of any desired pattern and attached to the standard or any other convenient part of the machine. A meter-casing V is indicated as attached to the side of the standard G in Figs. 25 and 26, with a ratchet-wheel $v^2$ mounted at one end to be actuated by a reciprocating pawl. Such a pawl $v'$ is shown pivoted to the stud $u'$, and by the eccentricity of the stud would be reciprocated back and forth upon the teeth of the ratchet-wheel by a rotation of the drum-shaft in either direction. The ratchet-wheel would be connected with suitable counting mechanism or with indicators or dials of any desired character, (as the three index-hands shown upon the meter,) and the meter would be constructed to show the total number of impulses transmitted to the ratchet-wheel, and would thus indicate with close approximation the total number of the drum revolutions in both directions. It is obviously immaterial whether the pawl be actuated by a crank-pin or by an eccentric applied to some point upon the drum-shaft, or whether a cam or other device be used to actuate the register.

It will be understood that the word "drum" has been used herein to signify the hoisting device actuated by the motor and intermediate gearing; but such term is intended to have a general significance and to cover any kind of wheel or sheave, whether grooved or not, or adapted to actuate a rope or flat band whether wound or pressed upon it.

In Figs. 6 to 8, inclusive, is shown the construction for the worm-wheel F, the drum F', and the oil-guard T. The wheel F is attached to a flange $F^2$ upon the end of the drum to remove the torsional strain from the shaft G, and to prevent the oil from flying off from the wheel F or dripping upon the bed I surround the worm-wheel by a guard T, consisting in an annular casing with trough-shaped rim, as indicated by dotted lines in Fig. 7 and shown in the section at T in Fig. 8. The guard is sloped inward at its lower ends $T^2$, and any oil discharged within it is thus collected and delivered into the trough D.

In order to confine the oil to the rim of the worm-wheel, the flange $F^2$ is connected with the drum by a collar $F^3$, made smaller than the rim of the worm-wheel, so that the inner rim of the guard T may fit around the inner edge of the worm-wheel without interference, and I provide a door T' in the top of the guard to give access to the worm-teeth for cleaning the same without removing the entire guard.

I have shown the worm-shaft arranged in two different positions in Figs. 2 and 30 to show the scope of my invention and to show that the oil-trough may be constructed in both cases to retain the oil from the worm and to prevent its escape past the bearing $c$, which is intermediate to the worm and armature whether the armature-shaft be horizontal or inclined. In Fig. 30 a collar $v^{13}$ is shown affixed to the armature-shaft outside of the intermediate bearing $c$, and a passage $v^4$, with an inclined bottom, is made underneath the intermediate bearing $c$ to receive any oil that may work through the intermediate bearing to the collar $v^{13}$, which is grooved to cause its inner edge to throw off the oil by centrifugal force into such inclined passage $v^4$, from whence it is led back to the trough D. A concave guard $v^5$ is formed over the collar $v^{13}$ to prevent oil from being thrown outward and to lead any oil which flies from the collar into the passage $v^4$. With the inclined shaft the oil naturally accumulates at the lower end of the trough and is retained therein by the flange $j$, (shown in Fig. 2,) which, although perforated at $k$ to admit the boring-bar, as stated herein, is subsequently closed by a plate $k'$, so that the oil cannot escape therefrom.

By comparing Fig. 2 with Fig. 30 it will be observed that the inclination of the armature and worm shafts makes the machine lower and more compact without adding in any way to the expense.

In Fig. 30 two thrust-bearings are shown applied to the opposite ends of the worm; but I prefer the entire construction shown in Fig. 2, and have therefore claimed the same specifically therein.

The brake-lever I is shown pressed normally upon the brake-wheel to resist the motion of the worm and hoisting-drum and to withdraw the lever when the motor is in operation. The brake is shown included in the motor-circuit, so as to be energized by the whole current when passing through the motor. The electrical connections for this arrangement are shown in Figs. 1, 2, and 24, the motor being shown wound in series and the current conducted from the negative-brush holder to the coils of the brake-magnet. In the figures mentioned the + line is shown connected with one of the magnet-coils B, and from thence to the other magnet-coil B', and from thence by the wire $c^5$ to the positive-brush holder $e^9$.

The brush-holders are omitted from Fig. 1, but shown in Fig. 2, and the current is conducted from the negative-brush holder $e^{10}$ by the wire $c^6$ to one terminal of the magnet-coils, and from the other terminal of the the same by wire $c^7$ to the — line. When the motor is in operation, the magnet is therefore energized with the full force of the current and the lever I withdrawn by the core I' from the brake-wheel; but should the current through the motor become obstructed by any accident or be turned off to stop the motor the attraction of the magnet would be diminished or withdrawn and the brake-lever would be pressed automatically upon the brake-wheel by the spring $m^3$.

Fig. 27 shows a diagram, without the bed, of the motor-armature $a$ and the worm $e$, connected with the drum F' by two worm-wheels $F^4$ and $F^5$, the latter being driven by a worm $F^6$, indicated merely by a circle upon the shaft $F^7$ of the worm-wheel $F^4$. Fig. 28 shows the armature and its worm connected with the drum by a worm-wheel $F^8$, a spur-pinion $F^9$ upon its shaft, and a spur-wheel $F^{10}$ upon the shaft of the drum F'. Fig. 29 shows the armature and its worm connected with the drum by worm-wheel $F^{11}$ and a spur-pinion $a^4$ upon the worm-wheel shaft $a^5$, the spur-pinion meshing in an internal gear $F^{12}$ upon the shaft of the drum F'. These three diagrams are shown to illustrate the intermediate gearings that may be used to connect the worm upon the armature-shaft with the hoisting drum or pulley, and the form of the bed upon which the motor-magnet cores are mounted could be readily modified to sustain such intermediate gearing and the drum in their proper relations to the armature-shaft without affecting the functions of the bed as a single bridge connecting the two cores of the motor-magnet.

My invention is limited in its application to a motor having only two magnet-cores connected by a single bridge, as a single bed or frame only is required in such case to form a bridge for the magnet-cores, and may be readily arranged at one side of the motor-armature to serve such function, while it supports the other elements of the hoisting-machine in their proper relations to the armature. Such construction is much more simple and inexpensive than one in which a motor is employed having four or more magnet-cores—as in such latter case the bed cannot be formed with the magnet-cores or supporting-lugs (such as are shown herein at A') projected directly from one side thereof. I have therefore made a specific claim herein to the bed consisting in the bar A, having the lugs A', with the magnet-cores attached directly thereto and provided with lateral extensions for the bearings of the armature and drum shafts.

I do not claim herein the mere combination of an electric motor with hoisting mechanism, but have made claims to a specific construction of the bed adapted to sustain one end of the hoisting-drum only, and have made in other patent applications specific claims for beds of other constructions.

I am aware that two commutator-brushes have been sustained in holders insulated from one another in a relation to the commutator similar to that I employ; but in my construction the brushes in each holder are of the same polarity and operate in a different manner from any heretofore used. I therefore disclaim the mere arrangement of two commutator-brushes in a single brush-holder pivoted as shown herein, except they be connected electrically to have the same polarity, so that they need no insulation from one another.

Having thus set forth my invention, what I claim herein is—

1. The combination, in an electric hoisting-machine, of an electric motor, a hoisting shaft and drum, a worm upon the armature-shaft and a worm-wheel operated by the worm to rotate the hoisting-drum, a metallic frame supporting the said elements and provided with bearings for the armature-shaft and drum-shaft, and with an oil-trough, closed at its farther end, arranged beneath the worm-wheel, and the worm being inserted in such trough and the armature-shaft being extended into its nearer end to rotate it therein, as and for the purpose set forth.

2. The combination, in an electric hoisting-machine, of an electric motor, a hoisting shaft and drum, a worm upon the armature-shaft and a worm-wheel operated by the worm to rotate the hoisting-drum, a metallic frame supporting the said elements and provided with bearings for the armature-shaft and drum-shaft, and with an inclined trough, closed at its lower end, arranged beneath the worm-wheel, and the worm being inserted in such trough and the armature-shaft being inclined to rotate it therein, as and for the purpose set forth.

3. The combination, in an electric hoisting-machine, of an electric motor, a hoisting shaft and drum, a worm upon the armature-shaft and a worm-wheel operated by the worm to rotate the hoisting-drum, a metallic frame supporting the said elements and provided with bearings for the armature-shaft and drum-shaft, and with an oil-trough, closed at its farther end, arranged beneath the worm-wheel and provided with a thrust-plate within its closed end to receive the thrust of the worm, and the armature-shaft being extended through the nearer end of the trough and fitted to such thrust-plate, substantially as herein set forth.

4. The combination, in an electric hoisting-machine, of an electric motor, a hoisting shaft and drum, a worm upon the armature-shaft and a worm-wheel operated by the worm to rotate the hoisting-drum, a metallic frame supporting the said elements and provided with bearings for the armature-shaft and drum-shaft, and with an oil-trough, closed at its farther end, arranged beneath the worm-wheel and provided with a groove or bridges to retain a removable thrust-plate in place, and a thrust-plate fitted to such groove with the worm-shaft fitted thereto, as and for the purpose set forth.

5. The combination, in an electric hoisting-machine, of an electric motor, a hoisting shaft and drum, a worm upon the armature-shaft and a worm-wheel operated by the worm to rotate the hoisting-drum, a metallic frame supporting the said elements and provided with bearings for the armature-shaft and drum-shaft, and with an inclined trough, closed at its lower end, arranged beneath the worm-wheel and provided with a thrust-plate within its closed end to receive the thrust of the worm in both directions, and the armature-shaft being inclined and fitted to such thrust-plate, substantially as herein set forth.

6. The combination, in an electric hoisting-machine, of an electric motor, a hoisting shaft and drum, a worm upon the armature-shaft and a worm-wheel operated by the worm to rotate the hoisting-drum, a metallic frame supporting the said elements and provided with bearings for the armature-shaft and drum-shaft, and with an inclined trough, closed at its lower end, arranged beneath the worm-wheel and provided with a thrust-plate within its closed end to receive the thrust of the worm, and the armature-shaft being inclined and provided with collars fitted to the opposite sides of the thrust-plate, and with anti-friction balls or washers operating between said collars and thrust-plate, as and for the purpose set forth.

7. The combination, in an electric hoisting-machine, of the bed consisting in the bar A, lugs A', the magnet cores and coils B', attached thereto, lateral extensions provided with bearings, and the armature with shaft fitted to such bearings and provided with worm for actuating the hoisting-drum, as and for the purpose set forth.

8. In an electric hoisting-machine having an electric motor connected with a hoisting-drum, the combination, with the electric motor, of a shunting-switch provided with a movable shunt-block, a governor having radial rods affixed within a pulley-rim, weights movable radially upon such rods, a sleeve movable upon the armature-shaft, links connecting the weights and sleeve, and a lever and rod connecting the sleeve with the shunt-block, as and for the purpose set forth.

9. In an electric hoisting-machine having an electric motor connected with a hoisting-drum, the combination, with the electric motor, of a shunting-switch provided with a movable shunt-block, a governor having radial rods affixed within a pulley-rim, weights movable radially upon such rods, a sleeve movable upon the armature-shaft, links connecting the weights and sleeve, a lever and rod connecting the sleeve with the shunt-block, and a brake-lever fitted to press upon the rim of the pulley, as and for the purpose set forth.

10. In an electric hoisting-machine, the combination of a governor consisting in a hub rotated with the armature-shaft, radial rods fixed thereto, a sleeve movable longitudinally upon the shaft, weights linked to said sleeve and movable radially upon the rods, adjustable springs applied outside the weights, and a stop or abutment at the outer end of each rod to restrain the springs, as and for the purpose set forth.

11. In an electric hoisting-machine, the combination of a governor consisting of a hub rotated with the armature-shaft, radial rods fixed thereto, a sleeve movable longitudinally upon the shaft, weights linked to said sleeve and movable radially upon the rods, springs applied to the rods outside of the weights, abutments at the ends of the rods to restrain the springs, and adjusting-nuts applied to the weights to vary the tension of the springs, as and for the purpose set forth.

12. In an electric hoisting-machine in which the motion of the commutator is reversed, the combination, with a pivoted frame carrying two brush-holders, of a clamp applied to the armature-shaft and operated to rotate the brush-holder and reverse the brushes, substantially as herein set forth.

13. In an electric hoisting-machine in which the motion of the commutator is reversed, the combination, with a pivoted frame carrying two brush-holders, of a lug upon the frame extended toward the armature-shaft, and a friction-clamp upon the armature-shaft adapted to strike the lug upon opposite sides when the shaft is reversed, as and for the purpose set forth.

14. In an electric hoisting-machine in which the motion of the commutator is reversed, the combination, with the commutator, of two frames pivoted upon opposite sides of the same and provided each with two brush-holders having the inner ends of the brushes projected toward one another, the two brushes upon each holder being of the same polarity, and the opposite frames being adapted to hold the ends of the respective brushes on or near the opposite neutral points of the commutator and being operated to reverse the current through the commutator when the polarity of the brush-holders is reversed, as and for the purpose set forth.

15. In an electric hoisting-machine having a bed provided with the posts A, the combination of the motor-magnet cores secured to the posts, the motor-armature at right angles to the cores, a governor revolving with the armature-shaft and provided with expanding weights, a sleeve sliding upon the worm-shaft and linked to the governor-weights, a regulating-lever pivoted at its lower end upon the bed and extended upward past the armature-shaft and actuated by the governor-sleeve, a switch arranged upon the top of the motor, and a switch-connection attached to the upper end of the governor-shaft, the whole arranged and operated as and for the purpose set forth.

16. In an electric hoisting-machine, the combination, with the frame of the machine and the armature-shaft, of a brake-pulley attached thereto, a brake-lever, a solenoid-magnet affixed to the frame and provided with a perforated diaphragm near its inner end, a magnet-core attached to the brake-lever and inserted within the magnet, a stem projected from the core, and a spiral spring fitted to the stem between the core and the diaphragm, as and for the purpose set forth.

17. In an electric hoisting-machine, the combination, with the frame of the machine and the armature-shaft, of a brake-pulley attached thereto, a brake-lever, a solenoid-magnet affixed to the frame and provided with a perforated diaphragm near its inner end, a magnet-core attached to the brake-lever and inserted within the magnet, a stem projected from the core, a spiral spring fitted to the stem between the core and the diaphragm, and nuts applied to the stem in contact with the spring to adjust the pressure of the brake upon the brake-wheel, substantially as set forth.

18. In an electric hoisting-machine, the combination, with the frame sustaining the hoisting-drum and a worm-wheel attached thereto, of an armature-shaft inclined to the frame, with a worm and a brake-pulley attached thereto, a solenoid brake-magnet having inclined base and secured upon the frame transverse to the armature-shaft, and a core attached to the brake-lever and fitted within the magnet, as and for the purpose set forth.

19. In an electric hoisting-machine, the combination, with the frame sustaining the hoisting-drum and a worm-wheel attached thereto, of an armature-shaft inclined to the frame, with a worm to actuate the worm-wheel, a bearing at the higher extremity of the armature-shaft, a bush projecting from such bearing, a hollow cap fitted upon such bush to inclose the end of the shaft, and a hole in the cap to supply lubricant therein, substantially as herein set forth.

20. In an electric hoisting-machine, the combination, with a hoisting-drum adapted to reverse the motion of a hoisting-rope by reversing its own movement, of a registering mechanism actuated by the movements of the drum in both directions, as and for the purpose set forth.

21. In an electric hoisting-machine, the combination, with the hoisting-drum adapted to wind and unwind a hoisting-rope by reversing its movement, of a registering mechanism provided with a ratchet-wheel to operate its indicator, and a reciprocating pawl actuated by the reversible hoisting-drum to actuate said ratchet-wheel, as and for the purpose set forth.

22. In an electric hoisting-machine, the combination, with the hoisting-drum adapted to wind and unwind a hoisting-rope by reversing its movement, of a registering mechanism provided with a ratchet-wheel to operate its indicator, a crank upon the shaft of the hoisting-drum, and a pawl pivoted upon said crank and actuating the ratchet-wheel to operate the indicator by the rotations of the drum, substantially as herein set forth.

In testimony whereof I have hereunto set my hand in the presence of two subscribing witnesses.

WM. BAXTER, JR.

Witnesses:
L. LEE,
THOS. S. CRANE.